(12) United States Patent
Sturdy

(10) Patent No.: US 7,182,967 B1
(45) Date of Patent: Feb. 27, 2007

(54) METHOD FOR STERILIZING CANNED ACKEE

(76) Inventor: Ian Charles Sturdy, 3606 Bay Way, Hollywood, FL (US) 33026

( * ) Notice: Subject to any disclaimer, the term of this patent is extended or adjusted under 35 U.S.C. 154(b) by 0 days.

(21) Appl. No.: 11/164,680

(22) Filed: Dec. 1, 2005

(51) Int. Cl.
*B65B 55/00* (2006.01)

(52) U.S. Cl. .................. 426/392; 426/397; 426/407

(58) Field of Classification Search .............. 426/392, 426/397, 407, 442
See application file for complete search history.

(56) References Cited

U.S. PATENT DOCUMENTS

| 5,599,872 | A | * | 2/1997 | Sulewski | .................. 524/522 |
| 5,645,879 | A | * | 7/1997 | Bourne | ..................... 426/321 |
| 5,843,511 | A | * | 12/1998 | Bourne | ..................... 426/509 |

* cited by examiner

*Primary Examiner*—Milton I. Cano
*Assistant Examiner*—Jyoti Chawla
(74) *Attorney, Agent, or Firm*—Malin, Haley & DiMaggio, P.A.

(57) ABSTRACT

A method for sterilizing canned ackee using an acidic brine solution placed into a container holding either whole or diced ackee arils and heating the container and ackee arils within to a temperature not to exceed the boiling point of water.

12 Claims, No Drawings

METHOD FOR STERILIZING CANNED ACKEE

FIELD OF THE INVENTION

This invention relates to a method for sterilizing ackee, a tropical fruit aril, for canning using an acidic brine solution placed into the container along with the ackee arils.

DESCRIPTION OF RELATED ART

Ackee, also known as akee or vegetable brain, is a tropical fruit produced by a west African evergreen tree *Bligia sapida*. Only the ackee arils surrounding the seeds are eaten. The fleshy ackee arils have a leathery texture and a nut-like flavor and are edible only when ripe. In the United States, canned ackee is subject to import restrictions. The ackee tree is cultivated frequently in Florida and the Caribbean region. Ackee is particularly popular as a food item in Jamaica where salt cod and ackee is the national dish.

SUMMARY OF THE INVENTION

Ackee, or akee, is an evergreen tropical fruit tree (*Blighia sapida*) native to west Africa, having edible arils surrounding the seeds of the ackee fruit. The ackee arils are canned for storage, shipment, and later consumption by humans. The invention is for a method to sterilize ackee arils that are canned. The method comprises the steps of placing one or more ackee arils into a container of 1.5% brine solution and sealing the container holding the ackee arils. After sealing the ackee arils within the container, which is preferably a fruit lacquered metallic can, said container and the arils inside of said container are heated to a temperature of no more than 210 degrees Fahrenheit for 15 minutes. The method uses brine solution comprising 0.55% citric acid, 0.95% sodium chloride, and 98.5% water. Said brine solution should have a pH of approximately 2.25.

An object of this invention is to provide a safe and efficient method for sterilizing canned ackee for later human consumption.

Another object of this invention is to provide a method for sterilizing canned ackee whereby the canned ackee arils retain their firmness and good flavor.

In accordance with these and other objects which will become apparent hereinafter, the instant invention will now be described with particular reference to the accompanying drawings.

DETAILED DESCRIPTION

Ackee, or akee, is an evergreen tropical fruit tree (*Blighia sapida*) native to west Africa, which has been naturalized in Florida, Jamaica, and the rest of the Caribbean. The arils surrounding the seeds of the ackee fruit are a popular food item, and are canned for storage and later consumption by humans. The invention is for a method to sterilize ackee arils that are canned. The method comprises the steps of placing one or more ackee arils into a container of 1.5% brine solution and sealing the container holding the ackee arils. Preferably, the ackee arils will be packaged and sold for consumption in individual cans containing 24 to 36 ackee arils. The ackee arils may be either whole or diced when placed into the container, but preferably, are whole. Said container is preferably a fruit lacquered metallic can, although other containers such as containers constructed from glass or other metallic or semi-metallic alloys may also be used. The fruit lacquered metallic can includes a lining that renders the can rust-resistant. After sealing the ackee arils within the container, said container and the arils inside of said container are heated to a temperature of no more than 210 degrees Fahrenheit for 15 minutes. The temperature must not exceed the boiling point of 212 degrees Fahrenheit.

The method uses brine solution comprising 0.55% citric acid, 0.95% sodium chloride, and 98.5% water. Said brine solution should have a pH of approximately 2.25. Preferably, approximately 12.0 ounces of ackee arils are placed into a 20.0 fluid ounce can to which 8.0 ounces of brine solution is added. Initially, the ackee arils have a pH of approximately 5.6. The brine solution with a pH of 2.25 is added to the can of ackee arils, and once mixed together, the contents of the can (ackee arils plus brine solution) stabilize to a pH within a range of 4.3 to 4.5. The acidic nature of the brine solution permits the ackee to be sterilized for purposes of canning without raising the heating temperature to meet or exceed the boiling point at 212 degrees Fahrenheit. With conventional methods for sterilizing canned ackee, the ackee arils develop a soft, mushy texture and an unpleasant taste. The current method allows ackee arils to be canned and sterilized at a temperature below the boiling point so that the canned ackee remains firm and retains a good flavor.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for sterilizing ackee, an aril produced by the tropical evergreen tree *Blighia sapida*, that is canned, such that the canned ackee arils retain their firmness and good flavor, said method comprising the steps of:

placing one or more ackee arils, which are either whole or diced, into a container of an acidic brine solution;

sealing the container holding the ackee arils; and heating the container holding the ackee arils to a temperature that is not to reach or exceed the boiling point of water at 212 degrees Fahrenheit.

2. The method of claim 1, wherein the brine solution placed into the container is preferably a 1.5% brine solution.

3. The method of claim 1, wherein the brine solution comprises 0.55% citric acid, 0.95% sodium chloride, and 98.5% water.

4. The method of claim 1, wherein the brine solution has a pH of 2.25.

5. The method of claim 1, wherein the ackee arils have an initial pH of 5.6.

6. The method of claim 1, wherein the ackee arils and brine solution placed within the container stabilize to a pH within a range of 4.3 to 4.5.

7. The method of claim 1, wherein the canned ackee arils are to be heated to a temperature of no more than 2:10 degrees Fahrenheit.

8. The method of claim 1, wherein the canned ackee arils are to be heated at a temperature of 2.10 degrees Fahrenheit for 15 minutes.

9. The method of claim 1, wherein the container for holding the ackee arils and brine solution is preferably a fruit lacquered metallic can.

10. The method of claim 1, wherein the container for holding the ackee arils and brine solution is manufactured from a material that is rust-resistant.

11. The method of claim 1, wherein the ackee arils preferably are packaged and sold for consumption in individual cans containing 24 to 36 ackee arils.

12. A method for sterilizing ackee, an aril produced by the tropical evergreen tree *Blighia sapida*, that is canned, such that the canned ackee arils retain their firmness and good flavor, said method comprising the steps of:

placing one or more whole ackee arils, into a fruit lacquered metallic can; wherein the ackee arils initially have a pH of 5.6;

filling said can with a 1.5% acidic brine solution having a pH of 2.25, said brine solution comprising 0.55% citric acid, 0.95% sodium chloride, and 98.5% water;

allowing the contents of the can, which includes the ackee arils and brine solution, to stabilize to a pH of 4.3 to 4.5;

sealing the can holding the ackee arils; and, heating the can holding the ackee arils to a temperature that is not to reach or exceed 210 degrees Fahrenheit for 15 minutes.

\* \* \* \* \*